June 15, 1954 — H. L. SHULDENER — 2,681,149
LIQUID TREATING EQUIPMENT
Filed Dec. 1, 1949
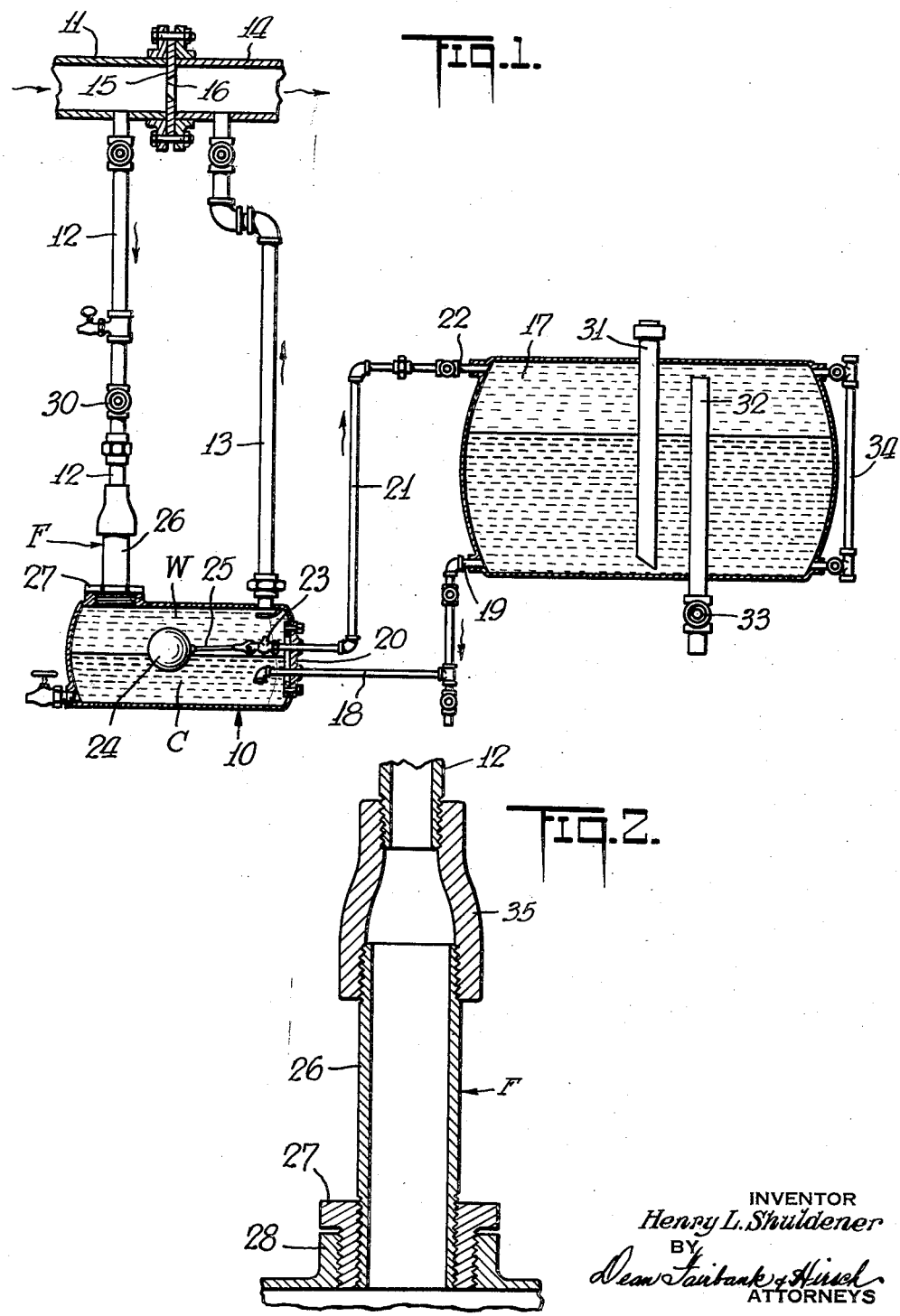
INVENTOR
*Henry L. Shuldener*
BY
*Dean Fairbank & Hirsch*
ATTORNEYS Patented June 15, 1954

2,681,149

UNITED STATES PATENT OFFICE 2,681,149

LIQUID TREATING EQUIPMENT

Henry L. Shuldener, Scarsdale, N. Y., assignor to Water Service Laboratories, Inc., New York, N. Y., a corporation of New York Application December 1, 1949, Serial No. 130,423

7 Claims. (Cl. 210—36)

The present invention is concerned with methods and equipment for introducing into a liquid stream of variable flow small amounts of chemical at a rate nearly proportional to the volume rate of the stream, and while the invention is applicable for a multiplicity of purposes in the chemical and industrial arts, one illustrative field of application, to which the embodiment shown in the drawings is particularly applicable, is for the introduction of appropriate chemical into the water supply system of a building in order to check the corrosion of ferrous and non-ferrous pipes.

It is among the objects of the invention automatically to introduce into a stream of liquid such as water delivered at rates varying below any given peak rate of flow, chemical such as sodium silicate, substantially without the need for service personnel (other than occasionally to check the operation and to recharge a storage tank with the requisite chemical), and yet to assure the entrainment with the liquid of the desired small proportion of the chemical at all times, with avoidance of either a deficiency or an over-supply of chemical.

Another object is to provide equipment of the above type which is of rugged construction and is devoid of needle valves or other highly restricted parts that require fine adjustment and are difficult to maintain adjusted and that are senstive to clogging or fouling.

Another object is to provide equipment of the above type, one identical model of which may readily and conveniently be adapted to feed chemical to be entrained at any predetermined rate for a given rate of the liquid stream.

The invention from one of its aspects is based on the discovery that small quantities of heavier chemical in solid, emulsified, or preferably in liquid form, may be introduced in approximately predetermined small proportions into a stream throughout wide ranges of variation in its rate of flow by diverting liquid from the main stream for impingement into a predetermined layer of the stream liquid that is superposed upon the chemical. The liquid in its return from said layer to the main stream will entrain chemical released as a consequence of the mild turbulence of the surface layer of chemical due to the impingement stream.

Substantial variation in the impinging distance, that is, in the height of the liquid through which the impinging stream diverted from the supply conduit is caused to operate upon the surface of the chemical, effects a substantial change in the amount of chemical picked up by the stream. Substantial constancy in the impinging distance is therefore desired and is attained by maintaining constant the height of liquid above the chemical bed in the tank, preferably by maintaining said tank charged with chemical to a substantially predetermined level and the rest of the tank filled with stream liquid.

The replenishment of chemical to the feed tank may be effected from a chemical storage tank by a conduit system which includes a pipe connection between the lower parts of the tanks for delivering chemical to the feed tank and a second pipe connection between the upper parts of the tanks for delivering stream liquid from the feed tank to the storage tank so that both tanks at all times have chemical at the bottom and are completely filled thereabove with stream liquid. The conduit system between the feed and storage tanks has a valve which serves to control the level of chemical in the feed tank and when closed prevents flow through said interconnecting conduit system. Any of a variety of control instrumentalities may serve automatically to open and re-close the valve. A float, for instance, resting upon the heavier chemical in the feed tank or in an auxiliary control tank, will serve the purpose. The valve desirably controls the flow of stream liquid from the upper part of the feed tank to the upper part of the storage tank and therefore effects flow of chemical from the storage tank to the feed tank to replenish the level of chemical in the latter until the float controlled valve re-closes.

From another aspect, the invention depends upon the discovery that for any given volume rate of the impinging stream, the amount of chemical picked up per unit volume of the liquid stream will remain nearly constant, as long as the linear velocity of such stream is kept between widely spaced minimum and maximum limits. A rough setting of the rate of chemical entrainment for a given volume rate of liquid stream may be attained by simply using an inlet nipple for the impingement stream, which is of diameter proportioned in an inverse ratio to the desired rate of linear velocity of the impingement stream, so that where an increased or decreased rate of pick-up is required for a given volume rate of the liquid stream, an inlet nipple of correspondingly smaller or larger bore respectively would be used for the impingement stream.

In the accompanying drawings in which are shown one or more of various possible embodiments of the several features of the invention, Fig. 1 is a longitudinal cross sectional view of the installation, and Fig. 2 is a cross sectional view on a larger scale, showing the inlet connection to the feed tank.

The system includes a container illustratively shown as a horizontal cylindrical feed tank 10 partly filled with chemical C, which has superposed thereover a layer W of liquid to be treated which fills the feed tank substantially in the absence of air spaces. In one important application, the chemical is sodium silicate and the liquid to be treated is water, and is shown applied to a water system in a building structure, such as for instance the water system of an apartment house, office building or hotel.

A proportion of the water from the main raw supply pipe 11 is diverted through inlet shunt conduit or pipe 12 into the feed tank 10 above the level of the chemical C therein, preferably through a fitting F in the top of said feed tank. Expulsion of the corresponding amount of water from the filled feed tank is effected through shunt return conduit or pipe 13, rising preferably from the top of the feed tank to section 14 of the main supply pipe, through which the treated water will flow. Between the main pipe sections 11 and 14, there is interposed a disk 15 having a knife edge orifice 16, which determines the desired pressure differential to assure shunting of the desired proportion of water through the feed tank 10.

In operation of the system as thus far described, such water or other carrying liquid as is shunted through the conduit or pipe 12 passes into the feed tank 10 and as a result of the impinging action through the intervening layer of water W upon the surface of the chemical bed C sets up mild turbulence on a restricted area of such bed, substantially directly under the shunt pipe discharge into the tank. The feed tank being filled with incompressible material, water flows through shunt return pipe 13 at corresponding rate into main pipe 14, entraining with it small amounts of the chemical released by the impinging stream.

The distance from the surface of the chemical bed C to the discharge end of the inlet shunt pipe 12 that delivers the impinging stream is defined as the impinging distance. Where, as shown in the drawings, the discharge end of the inlet pipe is flush with the inner wall of the feed tank, that distance is equal to the depth of the layer W of liquid in the tank above the chemical bed. However, that pipe may protrude into the feed tank with corresponding reduction in the impinging distance, if desired.

It is my discovery that for all practical purposes, that is between practical limits of variation in flow rate of the main raw supply stream, the concentration or proportion of chemical entrainment or pick-up proceeds according to the following laws:

(a) For a given volume rate and linear velocity of the impinging liquid stream, the chemical pick-up rate per unit volume rate of such stream varies in inverse ratio with the impinging distance.

(b) For a given impinging distance and linear velocity of the impinging liquid stream, the total chemical pick-up rate varies in direct ratio with the volume rate of such stream.

(c) For a given impinging distance and volume rate of the impinging liquid stream the total chemical pick-up rate varies in direct ratio with the linear velocity of such stream.

(d) The effective length of the inlet nipple fitting that discharges the impinging stream must be considerably greater than its bore diameter and preferably not less than three times that diameter in order to assure that operation occurs according to the proportionality laws (a), (b) and (c).

(e) Variation in the magnitude of the surface of the chemical bed has no effect on the chemical pick-up.

It follows that regardless of the magnitude of the surface of the chemical in the feed tank, if the conditions are maintained under which the foregoing laws operate, the concentration of chemical in the treated liquid will remain nearly constant for all practical purposes, regardless of such large variations in the rate of delivery of such liquid as are encountered under conditions of actual use.

To maintain the conditions for operation of the laws above set forth, it becomes desirable to avoid any substantial changes in the impinging distance during operation of the system. To this end the invention provides means to replenish the chemical in the feed tank as the level of the chemical bed becomes reduced. This result is accomplished by any of a variety of automatic control instrumentalities to feed the chemical from a storage tank for restoring the level once it has been reduced by a small fraction, say by 5 to 15 per cent of the height of the layer of liquid W in the feed tank 10 above the chemical bed.

In desirable equipment for the purpose, the storage tank 17 which is large enough to contain sufficient chemical for from one month to three months or more of operation, is connected by a conduit system with the feed tank. This system includes a chemical feed pipe 18 extending from fitting 19 at the lower part of the storage tank 17, preferably through the end wall 20 of the feed tank 10 to which it is connected as shown, well below the level of the chemical bed therein. The conduit system also includes a pipe 21 for conveying water or other stream liquid from well above the level of the chemical bed and preferably from near the top of the feed tank 10 to fitting 22 entering into the upper part, preferably near the top of the storage tank 17.

The system of storage tank 17, feed tank 10, and pipes 18 and 21 of the connecting conduit system is at all times completely filled with liquid, the chemical extending from the level thereof in the storage tank 17 through the pipe 18 to the level thereof in the feed tank 10 and water filling the rest of the system, that is the upper part of the storage tank 17, the upper part of the feed tank 10, and the connecting pipe 21 therebetween.

A valve suitably controlled governs the interchange of chemical and stream liquid between the storage tank and the feed tank. That valve 23 desirably may be above and clear of the heavier chemical C and is desirably within, though it may be in an auxiliary vessel outside of the feed tank 10. The valve may be controlled by any suitable instrumentality of any desired degree of refinement. For purposes of the specific installation herein disclosed, a float control is adequate. The float 24 may be of more or less conventional construction to actuate the conventional valve 23 through connecting lever 25. The float is of specific gravity adjusted so as to float upon the chemical bed C and sink in the lighter upper layer W.

As the level of the chemical bed drops, say one-half inch, the float 24 sinks correspondingly and opens the normally closed valve 23 so that under the pressure of the water main, water passes through the valve and water pipe 21 into the top of the storage tank and a corresponding volume of chemical is displaced from the lower part of the storage tank 17 by way of pipe 18 into the lower part of the feed tank 10 until the level of the chemical bed has been restored in said tank, at which time the valve 23 re-closes and further interchange of liquid is prevented until so much chemical has been consumed from the feed tank as to cause the replenishing operation to be repeated.

Thus the level of chemical bed in the feed tank is maintained nearly constant, as is the height of stream liquid in the layer thereabove that fills the feed tank, so that the impinging distance is maintained nearly uniform and the rate of pick-up of chemical in operation of the system will remain substantially proportional, as desired, to the rate of flow of the water or other liquid stream.

The system described may readily be calibrated to afford a given proportion of chemical pick-up for a given rate of consumption of water or other stream liquid. Increase or decrease of that given rate of feed, depending upon the particular requirements which the equipment is to serve, may readily be effected by the initial setting of the float to determine a higher or a lower level of chemical bed within the feed tank and a correspondingly lesser or greater impinging distance. In general, however, the calibration may be effected without changing the setting within the feed tank. This can be done within rough limits, by the simple expedient of selecting for delivery of the impinging stream into the feed tank, an inlet nipple 26 of predetermined bore diameter. For any given volume rate of the impinging stream, the smaller the bore diameter of that inlet nipple, the greater the linear velocity of impingement stream to the feed tank, and therefore the greater the concentration or proportion of chemical pick-up, that is the amount of chemical pick-up per unit volume of stream liquid. Accordingly there would be kept in stock a selection of inlet nipple fittings 26 of various bore diameters which, in general, are larger but for specific applications may be smaller than the bore diameter of inlet conduit 12. Illustratively such nipple fittings may be of standard pipe stock of 2 inch, 1.5 inch, 1 inch, .75 inch, etc., each having a mounting bushing 27 fixed on one end thereof and of the same inner diameter as the spud 28 on the feed tank in which it is to be accommodated and a coupling sleeve 35 fixed on the other end thereof, to fit at its extremity upon the end of inlet shunt pipe 12.

I have ascertained that in applying the invention to the treatment of unheated tap water with sodium silicate, the linear velocity of the impinging stream should be not less than approximately 0.1 foot per second and not greater than approximately 0.5 foot per second at the impinging distance of about 5 inches. With an impinging stream of linear velocity substantially below said minimum or substantially above said maximum value, the laws of substantial proportionality above set forth no longer obtain and the rate of feed becomes too low at the lower end and excessive at the other end of the range.

If, as is preferred, the inlet nipple is so selected as to afford a linear velocity of the impinging water stream considerably above the lower and not above the upper limit, that is to say of 0.3 to 0.5 foot per second at the peak rate of flow in the main line, then the concentration of the treated water will remain substantially constant even during the periods of much less than the peak rates of water consumption, because under those conditions the rate of the impinging stream will practically always be above the minimum limit of 0.1 foot per second. However, even if during periods of relatively low consumption, the concentration of chemical should fall off, no particular harm would be done, since aproximately 75 to 85 per cent of the water is ordinarily consumed in an apartment house during two one and one-half (1½) hour peaks, or during a total of three hours.

In order to select the appropriate size or bore of inlet nipple fitting 26 for any given water supply system, it is merely necessary to ascertain the peak rate of water flow in the main line under actual operating conditions, and upon dividing that rate by the proportionality factor introduced by the orifice plate 15, by which the shunt path is effected, the linear velocity of feed through the shunt feed pipe can be determined and that velocity will be reduced to the desired velocity of impinging stream by selecting a nipple 26 of bore diameter that will deliver roughly such volume rate at the desired linear velocity.

Within the limits of variation of normal usage in the rate of water consumption in any building in which the equipment of the invention is used, the concentration of chemical in such water will remain nearly constant, the rate of pick-up being substantially proportional to the rate of the water feed through the tank. In operation, the installation in the water system of a building would effect an average concentration of approximately six to eight parts of silica per million parts of treated water, but greater concentration may be resorted to to meet special conditions.

For complete compliance with the statutory requirements and not by way of limitation, in one specific embodiment of the invention utilized for checking corrosion of pipes in a building, a feed tank is employed, as shown in the drawings, which comprises a horizontal cylindrical vessel with walls 15 inches long and of 8 inches diameter. That feed tank is charged with sodium silicate solution of 40 degrees Bé. to a height of approximately 3 inches. The main length of the shunt pipe system 12 is of one inch bore while the inlet nipple fitting F shown to come flush with the top of the tank is 1.5 inch pipe stock. The float valve 23 is of such degree of sensitivity as to open upon depression of the chemical bed by approximately one-half to three-quarters of an inch.

The shunt pipe system is provided with a control valve 30 which is initially so set as to reduce the velocity of flow through the shunt system to effect a linear velocity of the impinging stream emerging from the section F of approximately 0.2 foot per second when the main water flow through the pipe 11 is 30 gallons per minute. At the linear velocity of the impinging stream set forth, the rate of pick-up of the chemical will be approximately 140 parts per million silica in the liquid emerging through the outlet shunt pipe 13 and will be 6 parts per million silica in the main stream of treated water. As the rate of the main flow of water through pipes 11, 14 varies above or below the illustrative rate of 30 gallons per minute, the concentration of chemical in the main stream will remain nearly constant because the linear velocity of the impinging stream varying with the main flow rate stays within the limits of 0.1 and 0.5 foot per second regardless of the rate of water flow within the limits of variation of normal usage.

After installation, should a test or analysis of the treated water or preferably of the water in shunt return pipe 13 indicate that the treatment is greatly deficient or greatly excessive, correction is readily effected by substituting an inlet nipple fitting 26 of correspondingly smaller or larger bore, respectively.

While with a given orifice plate 15, the setting of the control valve 30 could serve to give any selected volume velocity of flow or any selected linear velocity of flow, it cannot in general be used to afford both the required volume velocity and the required linear velocity of flow required in applying the proportioning laws above set forth. Accordingly, control valve 30 is used only for the final adjustment, the approximate linear velocity of impinging stream being determined by selection of an inlet nipple fitting 26 of appropriate diameter.

Substantially the only service required in use of the equipment set forth, is from time to time to check the same and replenish the storage tank 17 with chemical. To this end the storage tank is provided with a filling tube 31 extending substantially the entire height thereof so that the filling will be effected from below the water in the tank and a drain pipe 32 rising from the bottom of the tank 17 permits the water to escape when the valve 33 at the lower end thereof is opened during filling. The storage tank 17 may be provided with a suitable gauge 34 of any conventional type for checking the height of chemical therein.

As many changes could be made in the above method and construction and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A hydraulic installation of the character described, comprising a feed tank for a lower layer of heavier liquid, a storage tank for such heavier liquid, means for passing lighter liquid into and out of the upper part of the feed tank in a stream passing over the heavier liquid in the liquid feed tank, level control means for autmatically replenishing the feed tank with heavier liquid from the storage tank to maintain a nearly constant level of the heavier liquid in said feed tank, and means for feeding lighter liquid from the feed tank to the top of the storage tank to replace with lighter liquid the volume of heavier liquid fed from the storage tank to the feed tank.

2. The combination recited in the claim 1 in which the tanks are connected by a conduit system including a pipe connecting the bottoms of the tanks for replenishment of the feed tank, and a second pipe connecting the tops of the tanks through which lighter liquid flows from the feed tank to the storage tank.

3. The combination recited in claim 2 in which a control valve in the conduit system is actuated when the level of heavier liquid in the feed tank becomes depressed to a predetermined extent, for permitting the replenishment flow recited in claim 1, and in which said valve automatically re-seats to prevent resumption of flow until a predetermined quantity of heavier liquid has been entrained from the feed tank.

4. A hydraulic installation comprising a smaller feed tank, a larger storage tank for heavier liquid, a pipe connecting the lower part of said storage tank to the lower part of the feed tank and serving to maintain the latter partly filled with the heavier liquid, an inlet conduit for admitting lighter liquid into the upper part of the feed tank to maintain the same completely filled above the level of heavier liquid therein, and a conduit connecting the upper part of the feed tank with the upper part of the storage tank and serving to maintain said storage tank completely charged with lighter liquid superposed over the heavier liquid therein, an outlet conduit discharging from the upper part of the feed tank, and a float controlled valve of specific gravity intermediate between that of the two liquids and floating upon the heavier liquid, said float valve normally closing one of the conduits between the two tanks and opening said conduit to permit reestablishment of the normal level of the heavier liquid in the feed tank upon depression of such level to substantially predetermined extent.

5. The combination recited in claim 4 in which the float controlled valve is in said feed tank and at the inlet of the conduit connecting the upper parts of the feed and storage tanks.

6. The combination recited in claim 4 in which the feed tank has an inlet nipple for discharging an impinging stream, said nipple being of effective bore diameter larger than that of the main length of the inlet conduit and of length at least substantially three times its said bore diameter.

7. The combination recited in claim 4 in which the feed tank has an inlet nipple for discharging an impinging stream, said nipple being of effective bore diameter smaller than that of the main length of the inlet conduit and of length at least substantially three times its said bore diameter.

References Cited in the file of this patent

UNITED STATES PATENTS

| Number | Name | Date |
|---|---|---|
| 1,050,111 | Deacon et al. | Jan. 14, 1913 |
| 1,796,407 | Shuldener | Mar. 17, 1931 |
| 1,855,323 | Sirch | Apr. 26, 1932 |
| 2,023,552 | Savage | Dec. 10, 1935 |
| 2,058,309 | Haering | Oct. 20, 1936 |
| 2,064,627 | Paine | Dec. 15, 1936 |
| 2,243,258 | Munn | May 27, 1941 |
| 2,311,532 | Gershon | Feb. 16, 1943 |
| 2,423,379 | Geiser | July 1, 1947 |
| 2,532,973 | Wallentin et al. | Dec. 5, 1950 |

FOREIGN PATENTS

| Number | Country | Date |
|---|---|---|
| 27,607 | Great Britain | 1909 |
| 408,457 | Great Britain | Feb. 23, 1938 |
| 582,455 | France | Oct. 15, 1924 |